May 13, 1952   A. P. CLAUSEN   2,596,839
FLUID TIGHT DETACHABLE COUPLING FOR TANK SECTIONS
Filed Jan. 23, 1950   2 SHEETS—SHEET 1
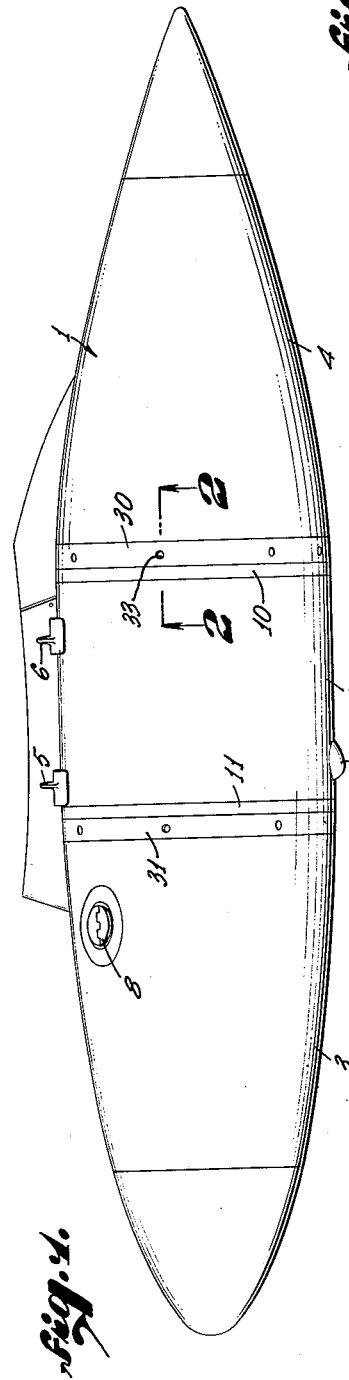
ALBERT P. CLAUSEN,
INVENTOR.
BY W. E. Beatty
ATTORNEY.

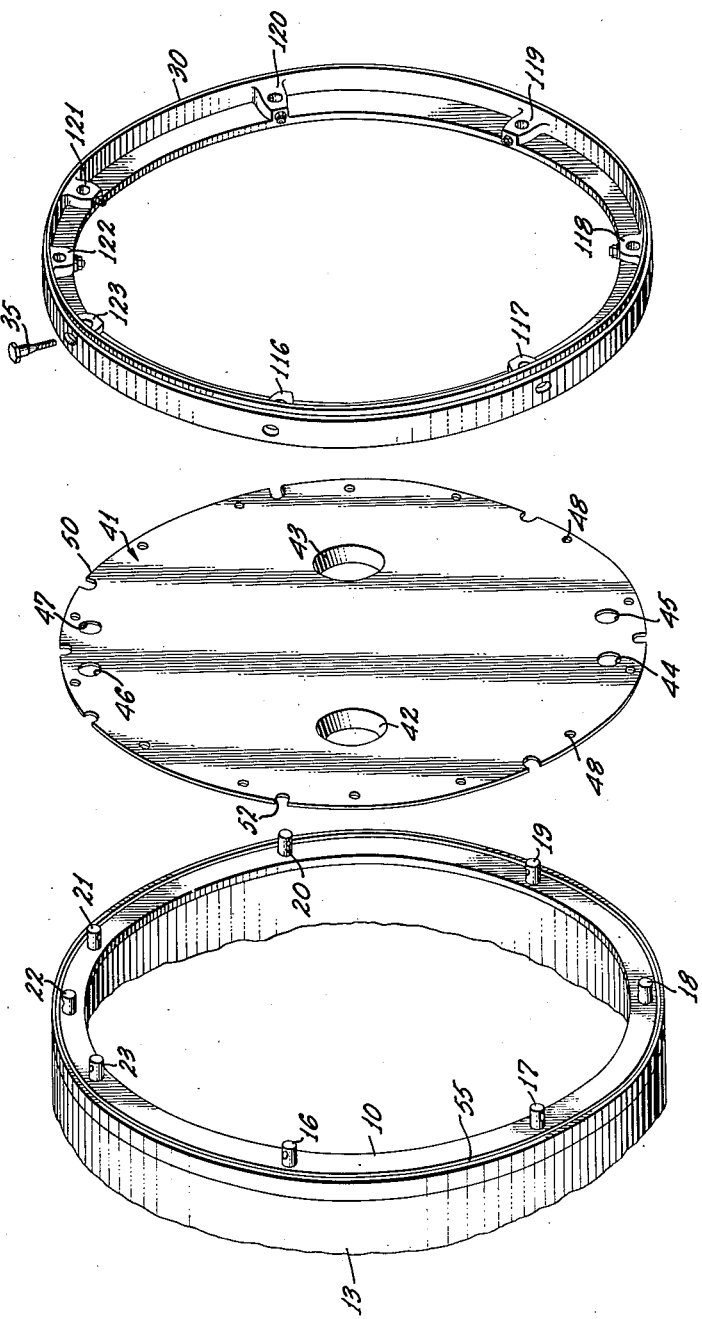

Patented May 13, 1952

2,596,839

UNITED STATES PATENT OFFICE 2,596,839

FLUIDTIGHT DETACHABLE COUPLING FOR TANK SECTIONS

Albert P. Clausen, Los Angeles, Calif.

Application January 23, 1950, Serial No. 140,129

7 Claims. (Cl. 220—75)

The invention relates to a fluidtight detachable coupling for tank sections. More particularly the invention relates to a sectionalized fuel tank adapted to be supported under the wing of an airplane and to be jettisoned when the fuel supply in the tank has been consumed.

The tank is made in three sections, i. e., nose and tail sections, and a midsection. When the airplane changes altitude, as the tank is suspended from its midportion, the nose and tail sections of the tank are subjected to a very great bending strain. An object of the invention is to provide for the sections an improved coupling having sufficient strength to withstand that strain.

A further object of the invention is to provide a tank having a plurality of sections, with a midsection which may be associated with nose sections and tail sections of various sizes in order to use the same midsection in building fuel tanks of various capacities as desired.

Another object of the invention is to prevent leakage of the fuel from the sectionalized tank, and more particularly an object is to provide an array of bolts which on being tightened serve one or more of the following functions, namely, draw the tank sections together, compress a seal between the tank sections, clamp a bulkhead between the sections and compress fluid seals for the bolts.

For further details of the invention reference may be made to the drawings wherein:

Fig. 1 is a side view in elevation of a fuel tank having sections connected by a detachable coupling according to the present invention.

Fig. 2 is an enlarged sectional view on line 2—2 of Fig. 1 looking in the direction of the arrows.

Fig. 3 is a sectional view on line 3—3 of Fig. 2 looking in the direction of the arrows.

Fig. 4 is an enlarged exploded view showing the right end of the midtank section and the left end of the tail section, showing the bulkhead therebetween and with a portion of the midsection broken away and with the skin of the tail section removed.

Referring in detail to the drawings, the fuel tank 1 comprises a midsection 2, a nose section 3 and a tail section 4. The midsection 2 has a pair of spaced hangers 5 and 6, reinforced by a frame work not shown inside of the section 2. The tank 1 is suspended from the wing of the airplane by the hangers 5 and 6. When the fuel supply is exhausted, tank 1 is jettisoned by means not shown and forming no part of the present invention. The midsection 2 has a navigation light 7 and the nose section 3 has a suitable filling cap 8.

As shown more particularly in Figs. 2, 3 and 4, the midsection 2 terminates at its right end in a cast aluminum alloy ring 10. The left end of midsection 2 also terminates in a similar ring 11, having all of the attachments like the ones about to be described for ring 10. The rings 10 and 11 each have a peripheral groove at the inner end of the ring as indicated at 12 in Fig. 2 to receive the end of the aluminum alloy skin 13 which fits in such groove and is welded thereto so as to lie flush with the outer surface of the ring as shown. The ring 10 has a circular array of a plurality of axially extending holes therethrough like hole 14 in Fig. 2, all of these holes being parallel to each other and to the axis of the midsection 2 of the tank. Mounted in the hole 14 is the shank 15 of a stud 16 and the other similar holes have similar studs 17—23. The studs 21 to 23 at the top of the tank section are more closely spaced than the other studs in order to give added strength at this point where there is a large bending strain when the plane changes altitude. Each stud like 16 has a shoulder like 24, see Fig. 2, which engages the outside of ring 10, and threads 25 for a nut 56 at the inside of the ring 10. Also each stud like 16 has a transverse radially extending bore 26, the outer portion of which has a conical taper 29 which tapers in an inward direction.

The studs 16—23 fit in corresponding holes like 27 in a circular array of bosses 116—123 cast integral with the companion ring 30 at the left end of the tail section 4. A ring like 30 is indicated at 31 in Fig. 1 for the right end of the nose section 3, to couple with the ring 11.

As shown in Fig. 3, the periphery of each stud like 16 is cylindrical and removably fits the holes like 27. The bores like 26 are adjusted to their proper radial direction by orienting each stud like 16 properly at the time that the nut like 56 is tightened. Each of the bosses 116—123 has a radial bore like 32 having an outer enlarged recess 33 for the head 34 of a bolt like 35, the recess 33 leading into a reduced bore portion 36 in which the shank 37 of the bolt fits. The radial bore 32 intersects the axial bore 27 and at the inner side thereof has a spline nut 38 fixed therein to receive the threads 39 on the reduced shank 40 of the bolt. Each bolt like 35 has a similar conical or tapered portion like 141 which fits the taper like 29 in any of the studs 16—23.

To prevent the fuel from surging in the tank, there is provided a bulkhead 41, see Fig. 4. Bulkhead 41 has spaced horizontal large expanded apertures 42 and 43, lower smaller apertures 44, 45 and small upper apertures 46, 47 which serve as ports to convey the liquid fuel or air from one tank section to the other in a restricted or slow manner to prevent surging. Other smaller holes like 48 may be provided adjacent the periphery of the baffle for the purpose above indicated. The baffle 41 may be suitably reinforced by one ore more vertical ribs not shown. The baffle 41 has a periphery 50 which fits between and is clamped by the rings 10 and 30, see Fig. 2, the end of ring 30 being cut away as indicated at 51 to house the periphery 50. The periphery 50 is oriented properly with respect to the studs 16 to 23 by having a corresponding plurality of peripheral notches like notch 52 to receive the corresponding stud like 16.

The rings 10 and 30 are illustrated as being circular and having outer transverse faces 53 and 54 respectively which fit in face-to-face relation when the sections 2 and 3 are clamped together by the bolts like 35. The studs 16 to 23 are arranged in a circle, and at a greater radius than the radius of these studs, the face 53 has an annular seal groove 55 for suitable packing or fluid seal such as an O-ring indicated at 56. The ring 56 is compressed to form a seal and prevent the liquid fuel from leaking at the contact of the faces 53 and 54, when the sections 2 and 4 are drawn together by the bolts like 35.

To prevent leakage around the shank 37 of the bolts like 35 through the bore 36, each recess like 33, under the head 34 of each bolt, is provided with a washer like 60 which fits over an O-ring 61 embraced by a washer 62.

The O-rings like 56 and 61 may be of neoprene or other resilient material resisting gasoline.

When the bolts like 35 are screwed home in their nuts like 38, they accomplish a number of functions as follows: (1) the corresponding sections like 2 and 4 are drawn together; (2) the ring seal like 56 is compressed to function as a seal to prevent leakage between the sections; (3) the seals like 61 are compressed to prevent leakage past the bolts like 35; (4) the periphery like 50 of the bulkhead is clamped between the rings like 10 and 30.

The outer end of the head 34 of each bolt lies flush with its ring like 30 to prevent wind drag.

If Fig. 2 is rotated about a vertical axis in the plane of the drawing at the left end thereof, it would show the details of construction of a similar section through the rings 11 and 31.

As the bolts like 35 are removable, the tank 1 may be taken apart for ease of shipment or repair. Also by providing nose sections like 3 and tail sections like 4 of different lengths, the same midsection 2 may be associated therewith to form tanks of various capacities, thereby simplifying the manufacturing procedure.

Various modifications may be made in the invention without departing from the spirit of the following claims.

I claim:

1. A tank comprising adjoining sections fitting together, each of said sections terminating in a ring having an annular face, the face of one of said rings fitting against the face of the ring of said adjoining section, a plurality of spaced studs carried by one of said rings, said studs extending parallel to each other and to the axis of their ring, each of said studs having a tapered bore extending radially of their ring, the ring of said adjoining section having spaced bores in which said studs fit, the ring of said adjoining section having a radial bore intersecting each of said spaced bores, a nut at one side of each of said radial bores, each of said radial bores at its outer end opening into an enlarged recess at the outside of the ring, a bulkhead having an outer edge fitting between said adjoining rings for clamping thereby, a seal groove in one of said rings outwardly of said spaced bores in which said studs fit, a packing in said seal groove in position to be compressed by the face of the adjoining ring, a bolt for each of said radial bores, each of said bolts having threads for one of said nuts as well as a tapered portion for the tapered bore in the associated said stud, each of said bolts having a head fitting inside of one of said recesses, and a fluid seal in each of said recesses around the associated bolt under its head for compression thereby.

2. A tank comprising adjoining sections fitting together, each of said sections terminating in a ring having an annular face, the face of one of said rings fitting against the face of the ring of said adjoining section, a plurality of spaced studs carried by one of said rings, said studs extending parallel to each other and to the axis of their ring, each of said studs having a tapered bore extending radially of their ring, the ring of said adjoining section having spaced bores in which said studs fit, the ring of said adjoining section having a radial bore intersecting each of said spaced bores, a nut at one side of each of said radial bores, each of said radial bores at its outer end opening into an enlarged recess at the outside of the ring, a bulkhead having an outer edge fitting between said adjoining rings for clamping thereby, a seal groove in one of said rings outwardly of said spaced bores in which said studs fit, a packing in said seal groove in position to be compressed by the face of the adjoining ring, a bolt for each of said radial bores, each of said bolts having threads for one of said nuts as well as a tapered portion for the tapered bore in the associated said stud, each of said bolts having a head fitting inside of one of said recesses, and a fluid seal for the outer end of each of said bolts.

3. In a streamlined fluid-carrying tank for mounting on an airplane in a position exposed to the airstream, the combination of: two tank sections positioned end to end; two rings forming the adjoining ends of the two tank sections respectively, said two rings being positioned face to face, one of said rings having intersecting radial and longitudinal bores with peripheral recesses around the radial bores; a sealing gasket between said two rings; cam elements on the other of said rings extending into said longitudinal bores; cam bolts extending into said radial bores into cooperation with said cam elements to draw the two rings together, said bolts having heads in said peripheral recesses; and sealing gaskets around said bolts in said recesses under said heads.

4. A combination as set forth in claim 3 in which said two rings cooperate to retain a bulkhead between the two tank sections.

5. In a tank of the character described, the combination of: two tank sections abutting each other end to end, the abutting end of one of said sections having a series of circumferentially spaced longitudinal bores positioned inwardly from its periphery and having corresponding radial bores from its periphery intersecting said longitudinal bores, respectively; a corresponding series of circumferentially spaced cam elements extending longitudinally from the abutting end of the other of said tank sections into said longitudinal bores, respectively; a corresponding series of cam bolts extending inwardly into said radial bores, respectively, into cooperation with said cam elements, respectively, whereby tightening of the cam bolts draws said two tank sections together by cam action; a sealing gasket between the abutting ends of said tank sections for compression by the cam action caused by tightening of said cam bolts; and sealing gaskets around said cam bolts for compression into sealing effectiveness by tightening of the cam bolts.

6. A combination as set forth in claim 5 in which said abutting ends of the two tank sections cooperate to retain a bulkhead therebetween.

7. A combination as set forth in claim 5 in which the outer ends of said radial bores are enlarged to form annular recesses in the periphery of the tank and in which said sealing gaskets are seated in said recesses with said cam bolts lying substantially entirely inside the periphery of the tank.

ALBERT P. CLAUSEN.

REFERENCES CITED

The following references are of record in the file of this patent:

UNITED STATES PATENTS

| Number | Name | Date |
|---|---|---|
| 704,366 | Phillips | July 8, 1902 |
| 1,039,058 | Hoeffel | Sept. 17, 1912 |
| 2,300,259 | Kueppers | Oct. 27, 1942 |
| 2,371,801 | Chester et al. | Mar. 20, 1945 |
| 2,396,005 | Gross et al. | Mar. 5, 1946 |
| 2,412,418 | Obermaier | Dec. 10, 1946 |
| 2,417,769 | Leonard et al. | Mar. 18, 1947 |
| 2,471,296 | Allen et al. | May 24, 1949 |

FOREIGN PATENTS

| Number | Country | Date |
|---|---|---|
| 273,350 | Great Britain | July 7, 1927 |